United States Patent
Kimura

(10) Patent No.: US 11,422,379 B2
(45) Date of Patent: Aug. 23, 2022

(54) HEAD-MOUNTED DISPLAY APPARATUS AND DISPLAY METHOD ADOPTING INTERPUPILLARY DISTANCE BASED IMAGE MODIFICATION

(71) Applicant: SEIKO EPSON CORPORATION, Tokyo (JP)

(72) Inventor: Fusashi Kimura, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/080,759

(22) Filed: Oct. 26, 2020

(65) Prior Publication Data

US 2021/0132386 A1    May 6, 2021

(30) Foreign Application Priority Data

Oct. 30, 2019   (JP) .............................. JP2019-197247

(51) Int. Cl.
  *G02B 27/01* (2006.01)
  *H04N 13/344* (2018.01)
  *G06T 7/73* (2017.01)

(52) U.S. Cl.
  CPC ....... *G02B 27/0172* (2013.01); *H04N 13/344* (2018.05); *G02B 2027/0134* (2013.01); *G02B 2027/0138* (2013.01); *G02B 2027/0178* (2013.01); *G06T 7/74* (2017.01); *G06T 2207/20224* (2013.01); *G06T 2207/30201* (2013.01)

(58) Field of Classification Search
  CPC .............. G02B 27/0172; G02B 27/017; G02B 27/0093; G02B 2027/0178; G02B 2027/014; G02B 2027/0138; G02B 2027/0187; G02B 2027/0134; H04N 13/344

See application file for complete search history.

(56) References Cited

U.S. PATENT DOCUMENTS

| | | | |
|---|---|---|---|
| 10,820,795 B1* | 11/2020 | Weise | G02B 27/0179 |
| 2002/0113755 A1* | 8/2002 | Lee | G02B 7/12 345/7 |
| 2008/0088529 A1* | 4/2008 | Tang | G02B 27/0172 345/8 |
| 2012/0162764 A1 | 6/2012 | Shimizu | |
| 2014/0104143 A1* | 4/2014 | Benson | G02B 27/017 345/8 |
| 2017/0344107 A1* | 11/2017 | Aghara | G02B 27/0179 |
| 2018/0348860 A1* | 12/2018 | Lin | G06K 9/0061 |
| 2019/0121428 A1 | 4/2019 | Chen et al. | |
| 2020/0413031 A1* | 12/2020 | Khani | H04N 13/363 |

FOREIGN PATENT DOCUMENTS

| | | |
|---|---|---|
| CN | 107682690 | 2/2018 |
| JP | 2012138654 | 7/2012 |
| JP | 5909849 | 4/2016 |

\* cited by examiner

*Primary Examiner* — Xuemei Zheng
(74) *Attorney, Agent, or Firm* — JCIPRNET

(57) ABSTRACT

When an image is displayed on two display units provided corresponding to both eyes of a user, an interpupillary distance of the user is acquired, an original image is modified according to a difference between the interval of the two display units and the acquired interpupillary distance, and the two display units are caused to display a modified image that was modified.

4 Claims, 11 Drawing Sheets

HEAD-MOUNTED DISPLAY APPARATUS AND DISPLAY METHOD ADOPTING INTERPUPILLARY DISTANCE BASED IMAGE MODIFICATION

The present application is based on, and claims priority from JP Application Serial Number 2019-197247, filed Oct. 30, 2019, the disclosure of which is hereby incorporated by reference herein in its entirety.

BACKGROUND

1. Technical Field

The present disclosure relates to a head-mounted display apparatus and a display method.

2. Related Art

In related art, a head-mounted display apparatus having a shape of eyeglasses (glasses) shape or goggles is known. In such a head-mounted display apparatus that realize binocular vision, when the distance between both eyes (interpupillary distance) of a user wearing the display apparatus does not match the distance between the left and right display regions of the display apparatus, the user may not see a part of the display image, or the display image may be blurred. Therefore, a display apparatus is proposed that includes an interpupillary distance adjusting mechanism configured to move the position of the left and right display regions of the display apparatus according to the interpupillary distance of the user (for example, JP-A-2012-138654).

However, when an interpupillary distance adjusting mechanism is provided, the structure of the head-mounted display apparatus becomes complex, and as a result, the size and weight may be increased.

SUMMARY

A display apparatus according to the present disclosure includes an interpupillary distance acquiring unit configured to acquire an interpupillary distance of a user, two display units corresponding to both eyes of the user, an image modification unit configured to modify an original image according to a difference between an interval of the two display units and the acquired interpupillary distance, and a display control unit configured to cause the two display units to display the modified image that was modified.

DESCRIPTION OF EXEMPLARY EMBODIMENTS

A. First Embodiment

A-1. Overall Configuration of Display Apparatus

Figure 1:
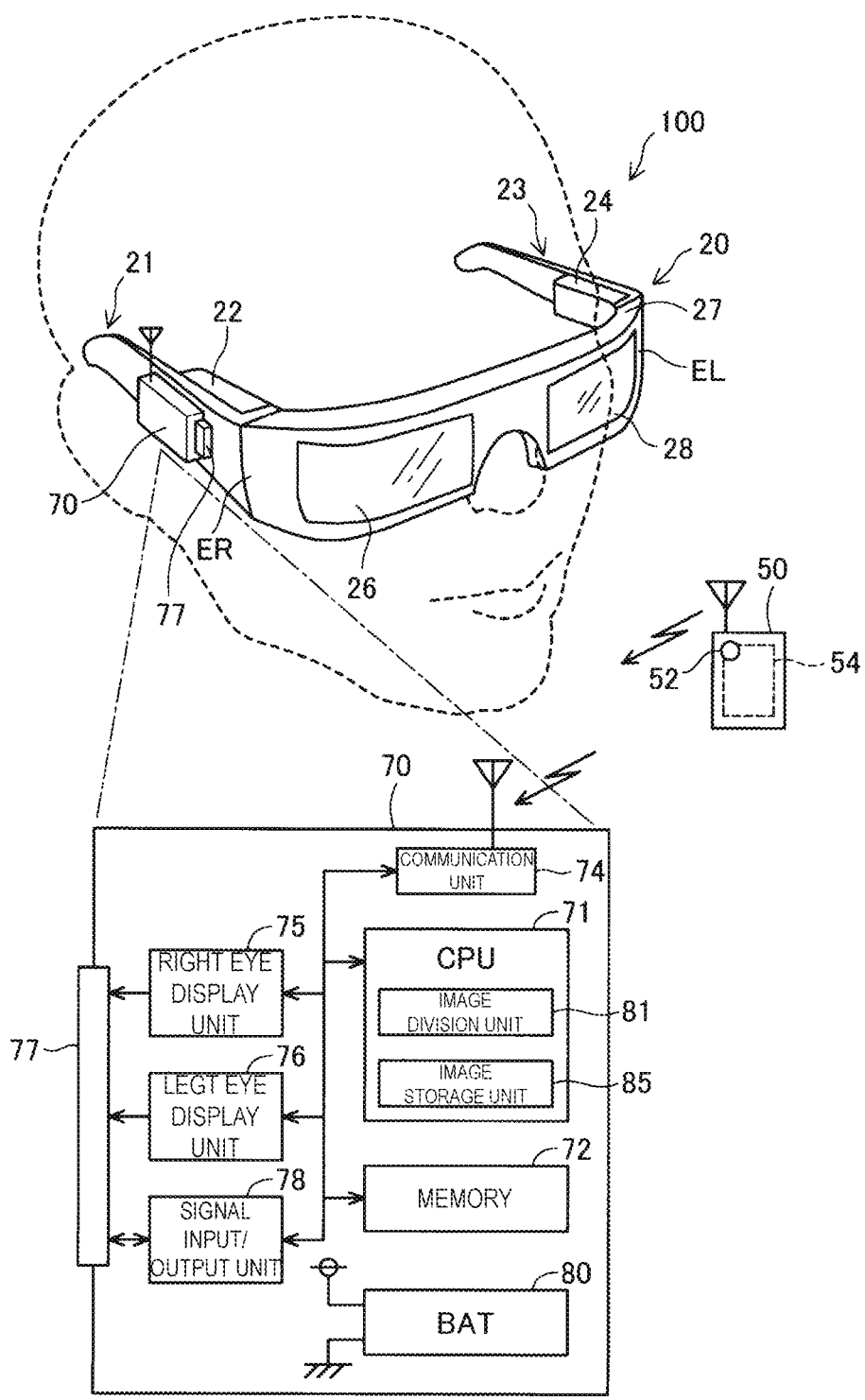
FIG. 1 is a schematic configuration view illustrating a head-mounted display apparatus according to a first embodiment.

FIG. 1 is a schematic configuration view illustrating a display apparatus 100 according to a first embodiment. The display apparatus 100 includes a glass display device 20, which is an eyeglasses-type display device, and a terminal device 50. The glass display device 20 and the terminal device 50 are configured to transmit and receive data to and from each other through WiFi communication. Only a camera 52 and a display panel 54 are illustrated in FIG. 1. However, as described below using FIG. 4, the terminal device 50 internally includes a CPU 51, a communication unit 58 configured to communicate with the glass display device 20, and the like.

The glass display device 20 is used by being worn on the head of a user, thus, it may be referred to as a Head-Mounted Display device (HMD). The display unit 20 having a shape of eyeglasses includes a main body including a right holding portion 21, a left holding portion 23, and a front frame 27, and further integrally includes, on the main body, a right display unit 22, a left display unit 24, a right light-guiding plate 26, a left light-guiding plate 28, and a display control unit 70.

The right holding portion 21 and the left holding portion 23 respectively extend rearward from ends of the front frame 27 to hold the glass display device 20 on the head of the user in a manner similar to the temples of a pair of eyeglasses. Here, one of both the ends of the front frame 27 located on the right side of the user in a state where the user wears the glass display device 20 is referred to as an end ER, and the other end located on the left side of the user in a state where the user wears the glass display device 20 is referred to as an end EL. The right holding portion 21 is provided to extend from an end portion ER of the front frame 27 to a position corresponding to the right temple of the user when the user wears the glass display device 20. The left holding portion 23 is provided to extend from an end portion EL of the front frame 27 to a position corresponding to the left temple of the user when the user wears the glass display device 20.

The right light-guiding plate 26 and the left light-guiding plate 28 are provided in the front frame 27. The right light-guiding plate 26 is positioned in front of the right eye of the user, when the user wears the glass display device 20, to allow the right eye to view an image. The left light-guiding plate 28 is positioned in front of the left eye of the user, when the user wears the glass display device 20, to allow the left eye to view an image.

The front frame 27 has a shape connecting an end of the right light-guiding plate 26 and an end of the left light-guiding plate 28 with each other. This connecting position corresponds to the position of the so-called bridge of the glass display device 20 of the eyeglasses-type. The front frame 27 may include a nose pad portion that is provided at the position of connection between the right light-guiding plate 26 and the left light-guiding plate 28, and that is in contact with the nose of the user when the user wears the glass display device 20. In this case, the nose pad portion, the right holding portion 21, and the left holding portion 23 allow the glass display device 20 to be held on the head of the user. A belt may also be attached to the right holding portion 21 and the left holding portion 23 that fits to the back of the head of the user when the user wears the glass display device 20. In this case, the belt allows the glass display device 20 to be firmly held on the head of the user.

The right display unit 22 is configured to display images on the right light-guiding plate 26. The right display unit 22 is provided on the right holding portion 21 and lies adjacent to the right temple of the user when the user wears the glass display device 20. The left display unit 24 is configured to display images on the left light-guiding plate 28. The left display unit 24 is provided on the left holding portion 23 and lies adjacent to the left temple of the user when the user wears the glass display device 20.

The right light-guiding plate 26 and the left light-guiding plate 28 according to the first embodiment are optical parts (such as prisms and holograms) formed of a light transmission-type resin or the like, and are configured to guide image light output by the right display unit 22 and the left display unit 24 to the eyes of the user. Surfaces of the right light-guiding plate 26 and the left light-guiding plate 28 may be provided with dimmer plates. The dimmer plates are thin-plate optical elements having a different transmittance for a different wavelength range of light, and function as so-called wavelength filters. The dimmer plates are arranged to cover a surface of the front frame 27 (a surface opposite to a surface facing the eyes of the user), for example. Appropriate selection of optical properties of the dimmer plates allows the transmittance of light to a desired wavelength range, such as visible light, infrared light, and ultraviolet light to be adjusted, and allows the amount of outside light entering the right light-guiding plate 26 and the left light-guiding plate 28 and passing through the right light-guiding plate 26 and the left light-guiding plate 28 to be adjusted.

The glass display device 20 is configured to guide imaging light generated by the right display unit 22 and the left display unit 24 to the right light-guiding plate 26 and the left light-guiding plate 28, respectively, and to use this imaging light to cause the user to visually recognize a virtual image (This may be referred to as "display an image"). When the outside light traveling from the front of the user passes through the right light-guiding plate 26 and the left light-guiding plate 28 and enters the eyes of the user, the image light forming a virtual image and the outside light enter the eyes of the user.

As illustrated in FIG. 1, the display control unit 70 includes a right eye display unit 75, a left eye display unit 76, a signal input/output unit 78, and the like, in addition to a CPU 71, a memory 72, and a communication unit 74 that are known. The display control 70 also includes a battery (BAT) configured to supply electric power to the entire glass display device 20. The display control unit 70 is internally equipped with a predetermined OS (Operating System), and CPU 71 is configured to realize various functions by executing a program stored in the memory 72 under the control of the OS. In FIG. 1, examples of the functions realized are illustrated in the CPU 71 as an image division unit 81, an image storage unit 85, and the like.

The communication unit 74 of the display control unit 70 exchanges data with the terminal device 50 by WiFi. The communication of the terminal device 50 may use BluTooth (registered trademark), 4G, or 5G communication network instead of WiFi. The CPU 71 is capable of acquiring, from the terminal 50 via the communication unit 74, image data to be displayed and information required for displaying the image, such as information about the interpupillary distance of the user. In the first embodiment, the interpupillary distance refers to the distance between the centers of the pupils of both eyes of the user. Alternatively, the interpupillary distance may be treated as the center-to-center distance of the black eyes on a captured image.

The right eye display unit 75 outputs an image to be visually recognized by the right eye of the user via the right light-guiding plate 26 by the right display unit 22. Similarly, the left eye display unit 76 outputs an image to be visually recognized by the left eye of the user via the left light-guiding plate 28 by the left display unit 24. The CPU 71 calculates the position of the image to be recognized by the user, computes a parallax of both eyes so that a virtual image is visible at the position, and outputs a right image and a left image with parallax to the right display unit 22 and the left display unit 24 via the right eye display unit 75 and the left eye display unit 76.

The signal input/output unit 78 exchanges various signals required for operation of the glass display device 20 including electric power from the battery 80 with the right display unit 22 and the left display unit 24. The signal from the signal input/output unit 78 is output to the right display unit 22 and the left display unit 24 via the connector 77 together with an image signal output by the right eye display unit 75 and the left eye display unit 76.

Figure 2:
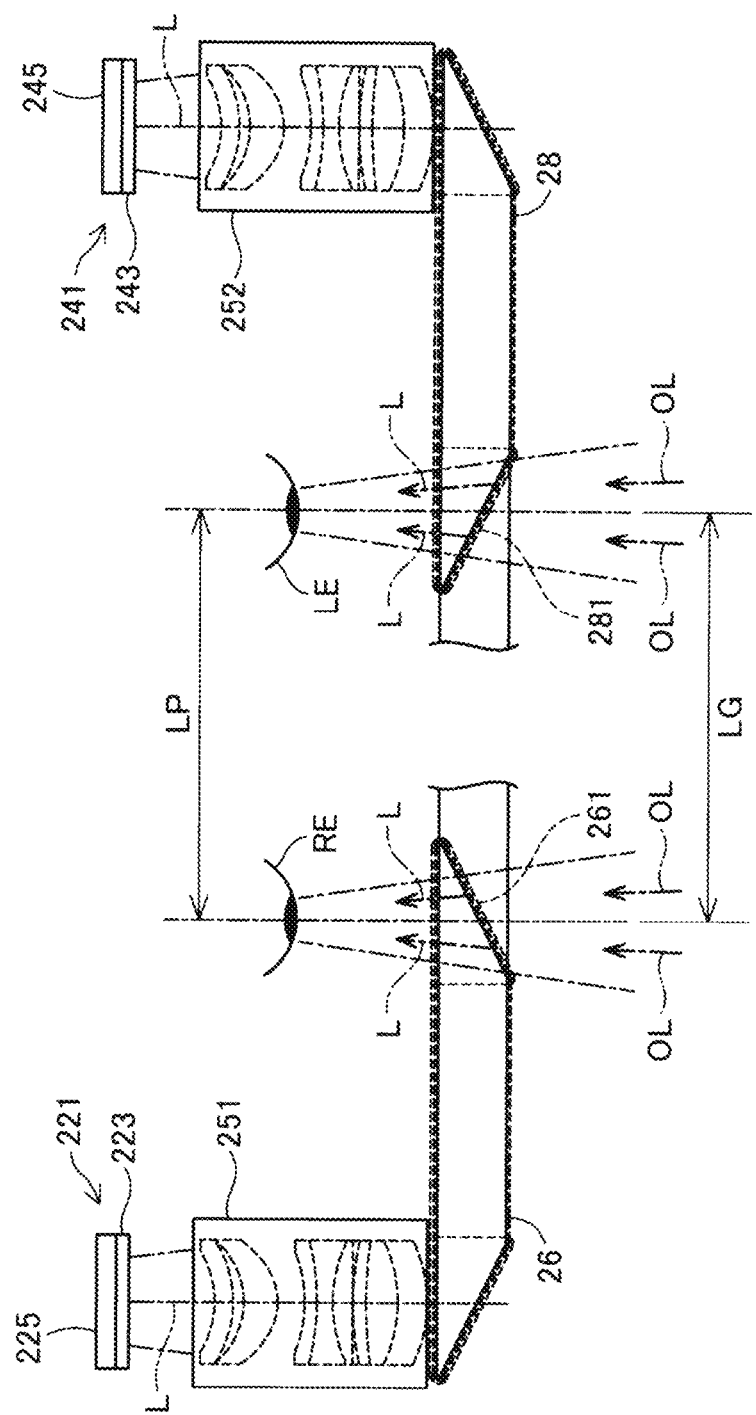
FIG. 2 is a plan view illustrating a main part of a configuration of an optical system included in an image display unit.

A-2. Configuration of Display Unit:

The right display unit 22 and the left display unit 24 are used to describe an optical configuration for causing an image to be recognized by the user. FIG. 2 is a plan view illustrating a main part of a configuration of an optical system included in the glass display device 20. For convenience of description, FIG. 2 illustrates the right eye RE and left eye LE of the user. As illustrated in FIG. 2, the right display unit 22 and the left display unit 24 are arranged symmetrically on the right- and left-hand sides.

To cause a virtual image to be visually recognized by the right eye RE, the right display unit 22 as a right image display unit includes an Organic Light Emitting Diode (OLED) unit 221 and a right optical system 251. The OLED unit 221 is configured to emit imaging light. The right optical unit 251 includes a lens group and the like and is configured to guide, to the right light-guiding plate 26, imaging light L emitted by the OLED unit 221.

The OLED unit 221 includes an OLED panel 223 and an OLED drive circuit 225 configured to drive the OLED panel 223. The OLED panel 223 is a light emission type display panel including light-emitting elements configured to emit red (R) color light, green (G) color light, and blue (B) color light, respectively, by organic electro-luminescence. The OLED panel 223 includes a plurality of pixels arranged in a matrix, each of the plurality of pixels including one element of R, one element of G, and one element of B.

The OLED drive circuit 225 is configured to select and power the light-emitting elements included in the OLED panel 223 to cause the light-emitting elements to emit light, according to a signal transmitted from the right eye display unit 75 of the display control unit 70. The OLED drive circuit 225 is secured by bonding or the like, for example, onto a rear face of the OLED panel 223, i.e., back of a light-emitting surface. The OLED drive circuit 225 may include, for example, a semiconductor device configured to drive the OLED panel 223, and may be mounted onto a substrate secured to the rear face of the OLED panel 223. The OLED panel 223 may be configured to include light-emitting elements, arranged in a matrix, that emit white color light, and color filters, disposed over the light-emitting elements, that correspond to the R color, the G color, and the B color, respectively. The OLED panel 223 may have a WRGB configuration including light-emitting elements configured to emit white (W) color light, in addition to light-emitting elements configured to emit R color light, G color light, and B color light, respectively.

The right optical system 251 includes a collimate lens configured to collimate the imaging light L emitted from the OLED panel 223. The imaging light L collimated by the collimate lens enters the right light-guiding plate 26. In an optical path configured to guide light inside the right light-guiding plate 26, a plurality of reflective faces configured to reflect the imaging light L is formed. The imaging light L is reflected multiple times inside the right light-guiding plate 26 and then, is guided to the right eye RE side. In the right light-guiding plate 26, a half mirror 261 (reflective face) located in front of the right eye RE is formed. The image light L reflected by the half mirror 261 is emitted from the right light-guiding plate 26 to the right eye RE. The image light L forms an image on the retina of the right eye RE to cause the virtual image to be recognized by the user.

To cause a virtual image to be visually recognized by the left eye LE, the left display unit 24 as a left image display unit includes an OLED unit 241 and a left optical system 252. The OLED unit 241 is configured to emit imaging light. The left optical system 252 includes a lens group and the like, and is configured to guide, to the left light-guiding plate 28, imaging light L emitted by the OLED unit 241. The OLED unit 241 includes an OLED panel 243 and an OLED drive circuit 245 configured to drive the OLED panel 243. For further details, the OLED unit 241, the OLED panel 243, and the OLED drive circuit 245 are the same as the OLED unit 221, the OLED panel 223, and the OLED drive circuit 225, respectively. A temperature sensor 239 is mounted on a substrate secured to a rear face of the OLED panel 243. Further, the details of the left optical system 252 are the same as those of the right optical system 251.

According to the configuration described above, the glass display device 20 may function as a see-through display device. That is, the imaging light L reflected by the half mirror 261 and the outside light OL passing through the right light-guiding plate 26 enter the right eye RE of the user. The imaging light L that is reflected by the half mirror 281 and the outside light OL that is passing through the left light-guiding plate 28 enter the left eye LE of the user. In this manner, the glass display device 20 causes the imaging light L of the internally processed image and the outside light OL to enter the eyes of the user in an overlapped manner. As a result, the user views outside scenery (real world) through the right light-guiding plate 26 and the left light-guiding plate 28 and also views the virtual image formed by the imaging light L overlapping the outside scenery. In other words, the glass display device 20 of the display apparatus 100 transmits the external scene to apply a virtual image to the user to visually recognize the external scene.

Note that, the half mirror 261 and the half mirror 281 are configured to reflect imaging light output by each of the right display unit 22 and the left display unit 24 and extract an image. Further, the right optical system 251 and the right light-guiding plate 26 are also collectively referred to as "right light-guiding unit", and the left optical system 252 and the left light-guiding plate 28 are also collectively referred to as "left light-guiding unit". Configurations of the right light-guiding unit and the left light-guiding unit are not limited to the example described above, and any desired configuration may be adopted as long as imaging light forms a virtual image in front of the eyes of the user. For example, diffraction gratings or translucent reflective films may be used for the right light-guiding unit and the left light-guiding unit.

Figure 3:
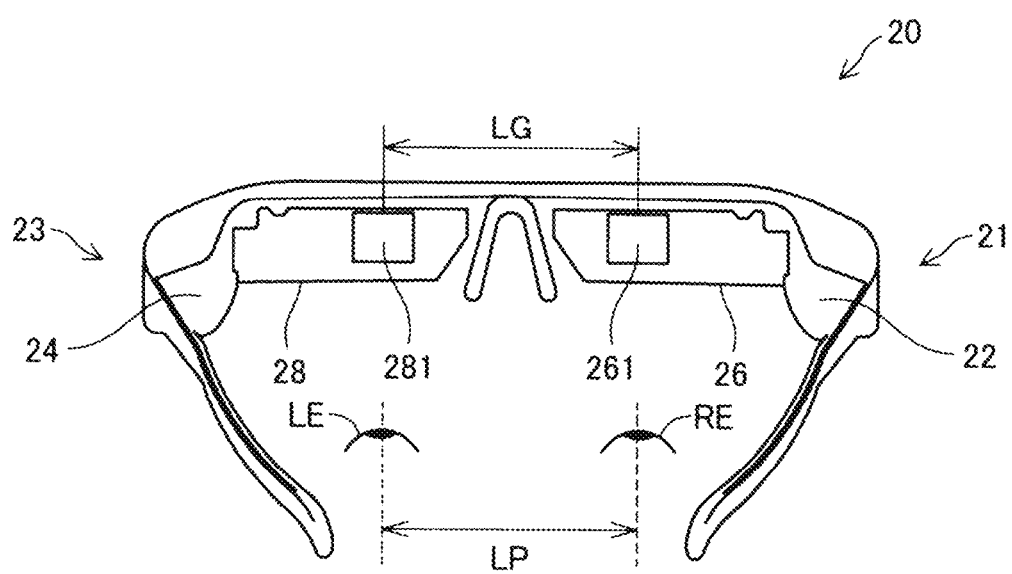
FIG. 3 is a diagram illustrating a main part of a configuration of the image display unit as viewed from a user.

FIG. 3 is a diagram illustrating a configuration of a main part of the glass display device 20 as viewed from the user. In the state illustrated in FIG. 3, back sides of the right light-guiding plate 26 and the left light-guiding plate 28 are visible. The half mirror 261 configured to irradiate imaging light to the right eye RE, and the half mirror 281 configured to irradiate imaging light to the left eye LE are also visible as approximately square-shaped regions. The user views an outside scenery through the entire areas of the right light-guiding plate 26 and the left light-guiding plate 28 including the half mirror 261 and the half mirror 281, and also views rectangular displayed images at the positions of the half mirror 261 and the half mirror 281.

A user wearing the glass display device 20 with the hardware configuration described above is capable of visually recognizing the outside scenery through the right light-guiding plate 26 and the left light-guiding plate 28 of the glass display device 20, and viewing the virtual image formed in the panel 223 and the panel 243 via the half mirror 261 and the half mirror 281. That is, the user of the glass display device 20 is capable of viewing the virtual image overlaid on a real outside scenery.

As illustrated in FIG. 2 and FIG. 3, it is desirable that a distance between the left eye LE and the right eye RE of the user (hereinafter referred to as "interpupillary distance") LP and an interval LG of the half mirrors 261 and 281 of the glass display device 20 match, but users who wears the glass display device 20 have individual differences, thus the interpupillary distance LP and the interval LG do not always match. When there is a difference between the interpupillary distance LP and the interval LG, a phenomenon may occur in which a part of the virtual image to be visually recognized by the user is missing or blurred. In the display apparatus 100, assuming that there is a difference between the interpupillary distance LP and the interval LG of the half mirrors 261 and 281, a process described below (hereinafter referred to as an interpupillary distance modification image display process) is performed.

Figure 4:
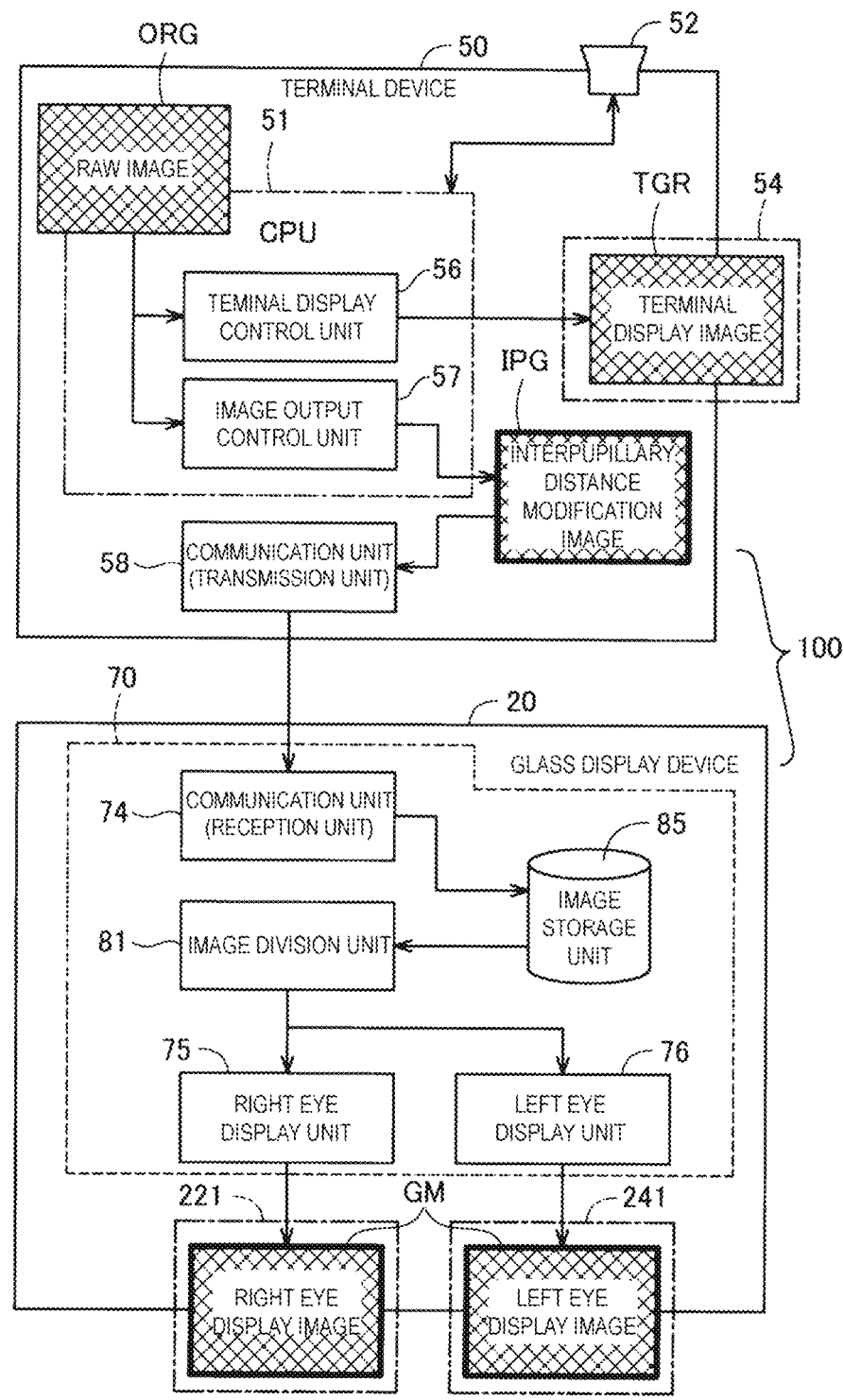
FIG. 4 is an explanatory diagram illustrating a mechanism of image display according to the first embodiment.

A-3. Interpupillary Distance Modification Display Process:

In the first embodiment, the interpupillary distance modification display process is performed by the terminal device 50. In the display apparatus 100, a main part for performing an interpupillary distance modification display process is illustrated in FIG. 4. In the first embodiment, the CPU 51 incorporated in the terminal device 50 prepares an original image ORG to be displayed on the glass display device 20. The CPU 51 includes a terminal display control unit 56 configured to cause the terminal display panel 54 of the terminal device 50 to display the original image ORG as a terminal display image TGR, and an image output control unit 57 that generates an interpupillary distance modification image IPG. The terminal display control unit 56 and the image output control unit 57 are realized by the CPU 51 executing a program stored in the memory 72. The CPU 51 causes the camera 52 incorporated in the terminal device 50 to capture an image of the face of the user. The CPU 51 reads the captured image and acquires the interpupillary distance LP of the user. The image output control unit 57 generates the interpupillary distance modification image IPG from the original image ORG using the interval LG of the half mirrors 261 and 281 of the glass display device 20 stored in advance and the acquired interpupillary distance LP. The generated interpupillary distance modification image IPG is transmitted to the glass display device 20 via the communication unit 58.

The glass display device 20 receives the interpupillary distance modification image IPG transmitted via the communication unit 74 incorporated in the display control unit 70, and temporarily stores the interpupillary distance modification image IPG in the image storage unit 85. The stored interpupillary distance modification image IPG is sequentially read and divided by the image division unit 81 into a right left image. In the first embodiment, the left display image and the right display image are divided as the same image. The divided image is output to the right eye display unit 75 and the left eye display unit 76, and output respectively to the OLED unit 221 for the right eye and the OLED unit 241 for the left eye. The OLED unit 221 and the OLED unit 241 respectively display images GM as a right eye display image and a left eye display image, the images GM include parallax information as described above, but are the same except for the parallax information. Note that the parallax information is added to the divided images after being divided, but may be added in the image division unit 81. The displayed images may not include the parallax information.

In the display apparatus 100 of the first embodiment, as described above, the original image ORG of the image displayed in the glass display device 20 is prepared on the terminal device 50 side, the interpupillary distance LP of the user is also acquired on the terminal device 50 side, and the modification of the image according to the interpupillary distance LP is also performed on the terminal device 50 side. The glass display device 20 only divides the image transmitted from the terminal device 50 and displays the image on the OLED unit 221 and the OLED unit 241.

Figure 5:
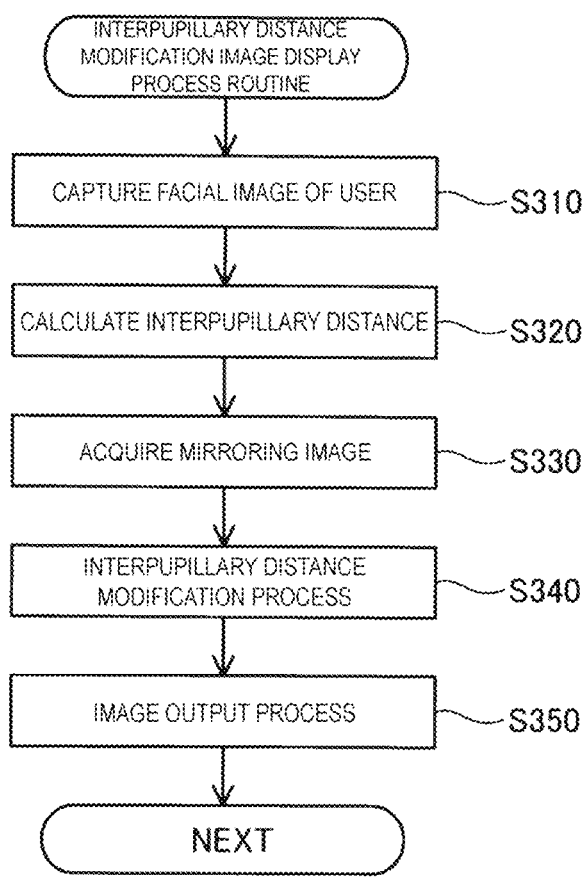
FIG. 5 is a flowchart illustrating an overview of an interpupillary distance modification image display process.

Thus, the interpupillary distance modification image display process realized by the image output control unit 57 of the terminal device 50 will be described in detail using the flowchart of FIG. 5. The interpupillary distance modification image display process routine illustrated in FIG. 5 is repeatedly executed when the terminal device 50 causes an image to be displayed on the glass display device 20. Note that in the first embodiment, the original image ORG is an image that is the same as the image displayed on the display panel 54 of the terminal device 50, that is, an image displayed acquired by mirroring in which the image displayed on the display panel 54 is displayed on the glass display device 20 as it is.

When the interpupillary distance modification image display process routine is started, the CPU 51 first captures a facial image of the user using the camera 52 (step S310). Then, this image is used to calculate the interpupillary distance LP of the user (step S320). If the user wears the glass display device 20, the calculation of the interpupillary distance LP is performed by comparing the distance from the end portion ER to the end portion EL of the glass display device 20 and the distance from the right eye RE to the left eye LE of the user. The distance from the end portion ER to the end portion EL is known, thus, it is easy to determine the interpupillary distance LP using a proportional relationship. When the user is not wearing the glass display device 20, the terminal device 50 may be configured to determine the distance to the face of the user from the position of the focused lens when the camera 52 captures the face of the user, and use the principle of triangulation to determine the interpupillary distance LP. Alternatively, the interpupillary distance LP may be calculated by capturing a pre-sized gauge or the like near the face of the user.

Next, the CPU 51 acquires a mirroring image as the original image ORG (step S330), and performs a process for modifying the acquired original image ORG using the interpupillary distance LP calculated in step S320 (step S340). The modification is performed as follows. The CPU 51 has previously acquired the interval LG of the half mirrors 261 and 281 of the glass display device 20 connected to the CPU 51. The interval LG may be manually input by the user in the terminal device 50 to be acquired by the CPU 51, or may be acquired by the CPU 51 from the glass display device 20 directly via communication. Thus, the interval LG and the interpupillary distance LP are compared, when they are not matched, the original image ORG is reduced by a shifting of them.

The CPU 51 performs an image output process of outputting the interpupillary distance modification image IPG reduced in this manner toward the glass display device 20 (step S350), and then exits to "next" and ends this process routine.

Figure 6:
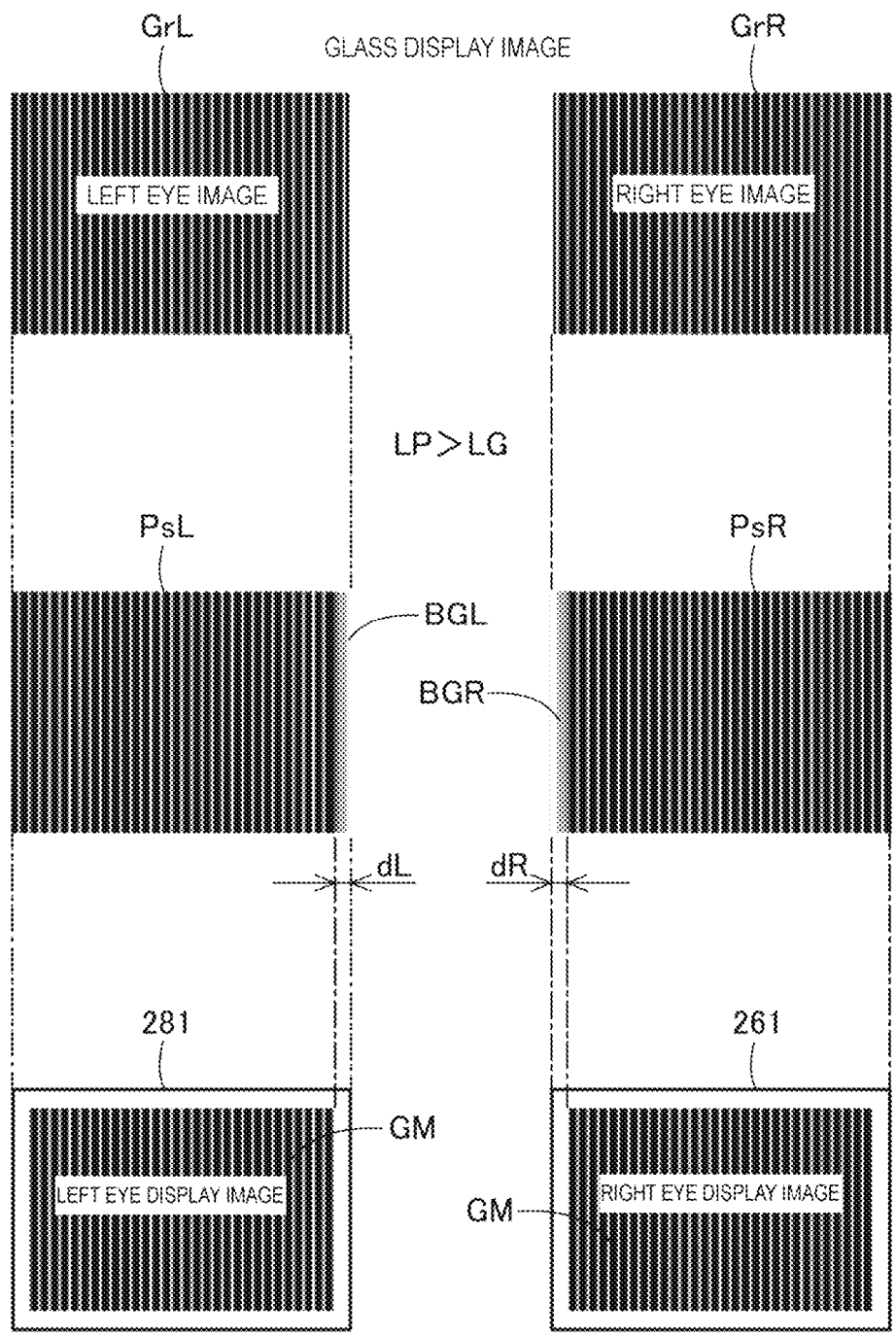
FIG. 6 is an explanatory diagram illustrating an example of image display.

A modification process in the interpupillary distance modification process (step S340) will be described using FIG. 6. In the top row of FIG. 6, a right eye image GrR displayed on the OLED unit 221 for the right eye and a left eye image GrL displayed on the OLED unit 241 for the left eye are illustrated. Both are the same images. This image is displayed on each of the OLED unit 221 and the OLED unit 241, and this image is visually recognized by the user as an image reflected on the half mirrors 261 and 281. At this time, when the interpupillary distance LP of the user and the interval LG of the image projected onto the half mirrors 261 and 281 do not match, an inner end portion or an outer end portion of the image will be missing or blurred. In the example illustrated in FIG. 6, since the interpupillary distance LP is greater than the interval LG, an inner end BGR of the image PsR on the half mirror 261 and the inner end BGL of the image PsL on the half mirror 281 are blurred. If the interpupillary distance LP is less than the interval LG, conversely, outer end of each of the image PsR on the half mirror 261 and the image PsL on the half mirror 281 are missing or blurred.

In contrast, in the first embodiment, the original image ORG is reduced according to the magnitude of the difference between the interpupillary distance LP and the interval LG (step S340). Thus, as illustrated in the bottom row of FIG. 6, the right eye display image GM and the left eye display image GM, which are images respectively displayed on the half mirror 261 and the half mirror 281, are both displayed in a state of being retracted inward by dimensions dR and dL at the inner end portions of display regions of the half mirror 261 and the half mirror 281. Of course, at the other end portions, that is, at the out end portions or upper and lower end portions as well, the images are also displayed by being retracted inward of the regions of the half mirror 261 and the half mirror 281.

As a result, due to the difference between the interpupillary distance LP and the gap LG, the image is not displayed at the portion where the image is missing or blurred, and thus the problem of the image is missing or blurred due to the interpupillary distance LP and the gap LG do not match is solved. Note that in the first embodiment, the interpupillary distance modification processing (step S340) is performed on the terminal device 50 side, but may also be performed on the glass display device 20 side. The interpupillary distance LP is acquired by analyzing the image using the camera 52, but the interpupillary distance may be manually input. The glass display device 20 of the first embodiment is not include a camera that captures an outside scenery, a microphone that acquires sound or ambient sound, earphones that transmit sound to the user, a multi-axis gyro sensor that detects movement of the head or the user, or the like, but at least a part of these equipment may be mounted on the glass display device 20. The battery 80 is equipped into the display control 70, but may be equipped separately.

B. Second Embodiment

B-1. Overall Configuration of Display Apparatus

Figure 7:
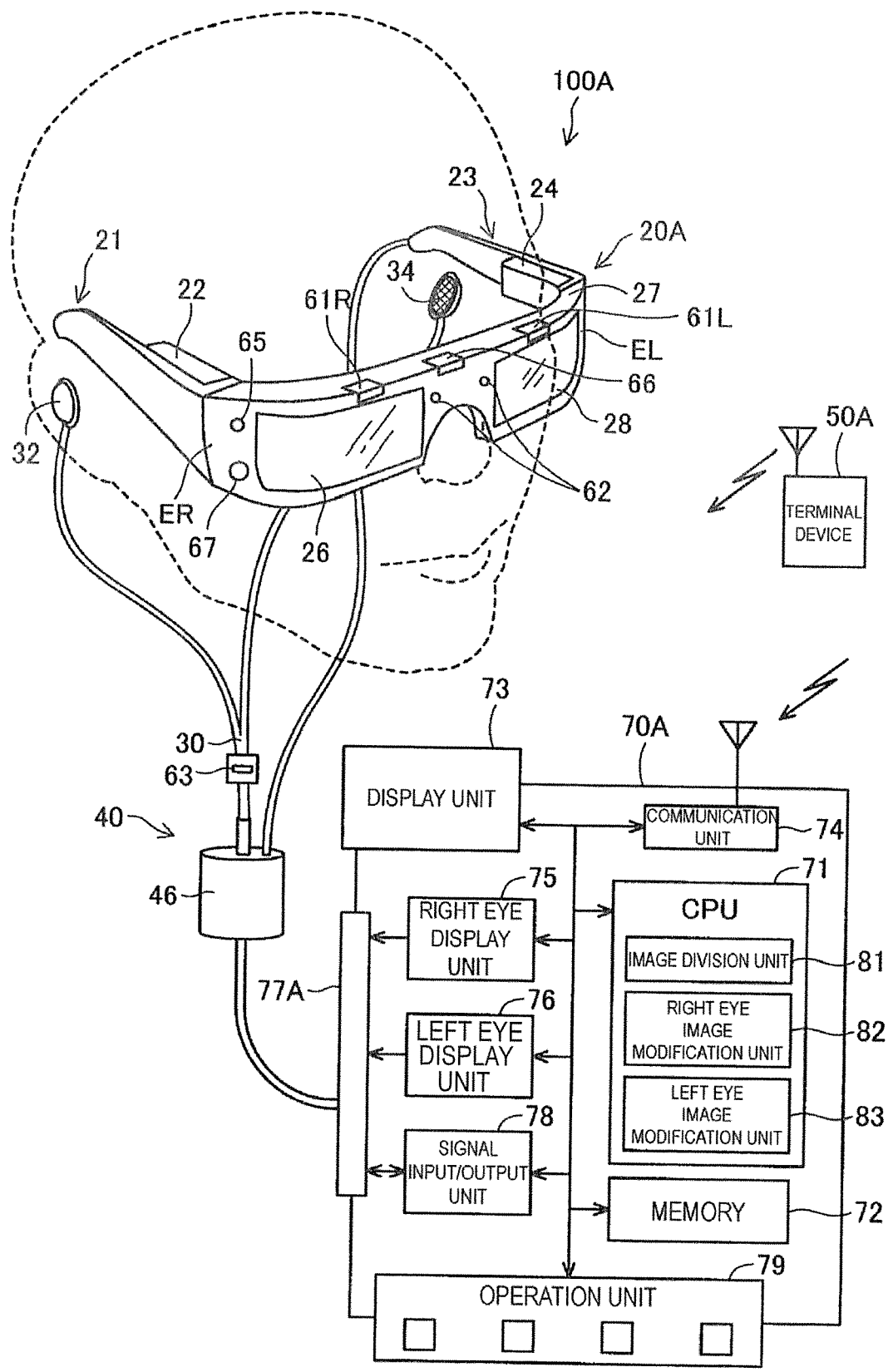
FIG. 7 is a schematic configuration view illustrating a head-mounted display apparatus according to a second embodiment.

Next, a display apparatus according to a second embodiment will be described. FIG. 7 is a schematic configuration view illustrating the display apparatus 100A according to the second embodiment. The display apparatus 100A of the second embodiment differs from the display apparatus 100 of the first embodiment in the following three points.

(1) The acquisition of the interpupillary distance is performed on a glass display device 20A side, rather than on the terminal device 50 side. The glass display device 20A includes the equipment necessary to acquire the interpupillary distance.

(2) A display control unit 70A is not integrated with the glass display device 20A, but is housed in a separate case and is connected to the glass display device 20A via a cable 40.

(3) The image modification according to the interpupillary distance is not performed on the terminal device 50 side, but is performed on the display control unit 70A side.

Hereinafter, focusing on these points, the device configuration of the display apparatus 100A will be described first.

In addition to the member included in the glass display device 20 of the first embodiment, the glass display device 20A includes cameras 61R and 61L, an inner camera 62, a illuminance sensor 65, a six-axis sensor 66, and a LED indicator 67. Two cameras 61R and 61L are arranged on the front frame 27 of the glass display device 20A. The two cameras 61R and 61L are provided at positions corresponding to approximately both eyes of the user, and it is possible to measure the distance to a target object by a so-called binocular vision. The distance is measured by the display control unit 70. Note that the cameras 61R and 61L may be provided anywhere as long as distance can be measured by binocular vision, or may be arranged on the end portions ER and EL of the front frame 27.

Same as the cameras 61R and 61L, the inner camera 62 is a digital camera including an imaging lens and an imaging element such as a CCD and a CMOS. The inner camera 62 is configured to capture an image in an inner direction of the glass display device 20A, in other words, in a direction facing the user wearing the glass display device 20A. The inner camera 62 according to the second embodiment includes an inner camera configured to capture an image of the right eye of the user, and an inner camera configured to capture an image of the left eye of the user. In the second embodiment, the width of the angle of view of the inner camera 62 is set within a range in which an image of the entire right eye or the entire left eye of the user can be captured. The inner camera 62 is used to detect the positions of both eyes of the user, particularly the pupils, and acquire the interpupillary distance LP of the user from the pupil positions of both eyes. Of course, the inner camera 62 may be a camera capable of imaging the right eye and the left eye at the same time.

The illuminance sensor 65 is provided at the end portion ER of the front frame 27 and is disposed to receive outside light coming from in front of the user wearing the glass display device 20. The illuminance sensor 65 is configured to output a detected value corresponding to the amount of received light (intensity of received light). The LED indicator 67 is disposed at the end portion ER of the front frame 27. The LED indicator 67 is configured to be turned on during image capturing by the cameras 61R and 61L or the inner camera 62 to notify that the image capturing is in progress.

The six-axis sensor 66 is an acceleration sensor and detects the amount of movement of the head of the user in XYZ directions (3 axes) and the inclination (3 axes) of the head of the user with respect to the XYZ directions. In the XYZ directions, the Z direction is a direction along the gravitational direction, and the X direction is a direction from the rear to the front of the user, and the Y direction is a direction from the left to the right of the user. Additionally, the inclination of the head is an angle around each axis (X-axis, Y-axis, Z-axis) in the XYZ directions. By integrating the signals from the six-axis sensor 66, it is possible to know the amount and angle of movement of the head of the user from the initial position.

The glass display device 20A is connected to the display control unit 70A via a connection cable 40. The connection cable 40 is pulled from the tip of the left holding portion 23 and is detachably connected to a connector 77A provided on the display control unit 70A via a relay connector 46. The connection cable 40 includes a headset 30. The headset 30 includes a microphone 63, a right earphone 32 and a left earphone 34 attached to the left ear and the right ear of the user. The headset 30 is connected to the relay connector 46 and is integrated into the connection cable 40.

The display control unit 70A connected to the glass display device 20A via the connection cable 40 is different from the display control unit 70 of the first embodiment in that the display control unit 70A includes the display unit 73 and the operation unit 79 and includes a right eye image modification unit 82 and a left eye image modification unit 83 in addition to the image division unit 81 inside the CPU 71. The display unit 73 displays necessary information, such as a menu for operating the display control unit 70A, an image for display on the 20A, and the like. The operation unit 79 selects a menu, inputs various types of information, and the like.

Figure 8:
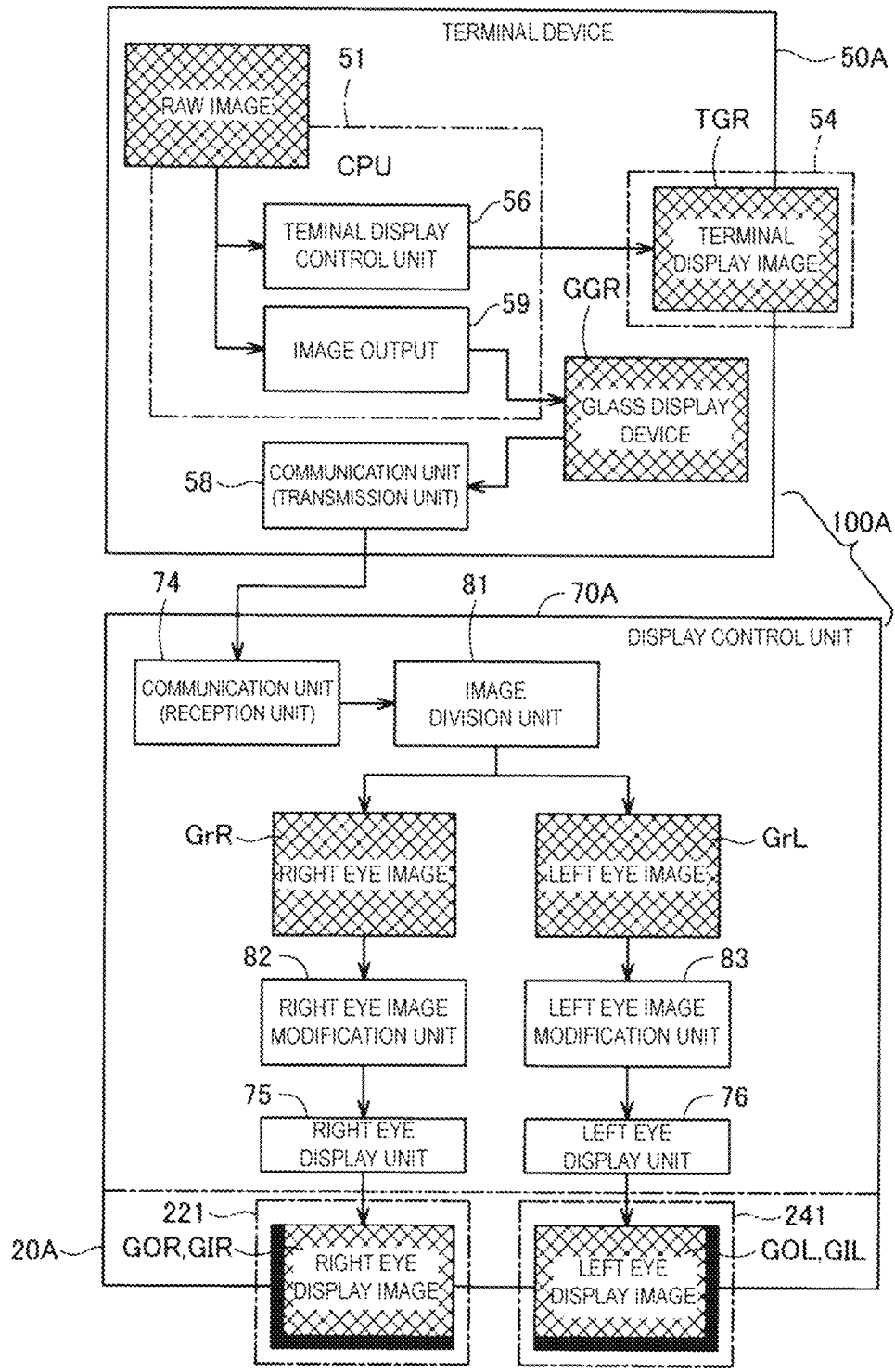
FIG. 8 is an explanatory diagram illustrating a mechanism of image display according to the second embodiment.

B-2. Interpupillary Distance Modification Display Process:

In the CPU 71, the image division unit 81, the right eye image modification unit 82, and the left eye image modification unit 83, which are realized by executing a program perform processes that modify the image received from the terminal device 50 by the interpupillary distance LP. In other words, in the second embodiment, the interpupillary distance modification display processing is performed by the display control unit 70A. In the display apparatus 100A, a main part for performing an interpupillary distance modification display process is illustrated in FIG. 8. In the display apparatus 100A, a main part for performing an interpupillary distance modification display process is illustrated in FIG. 8. The CPU 51 includes a terminal display control unit 56 configured to cause the display panel 54 of the terminal device 50 to display the original image ORG as the terminal display image TGR, and an image output unit 59 configured to output the original image ORG as a glass display image GGR, which is an image displayed in the display control unit 70A. The terminal display control unit 56 and the image output unit 59 are realized by executing a program in which the CPU 51 is stored in the memory 72. The output glass display image GGR is transmitted to the glass display device 20A via the communication unit 58.

The glass display device 20A receives the glass display image GGR transmitted via the communication unit 74 incorporated in the display control unit 70A, and outputs the glass display image GGR to the image division unit 81. The image division unit 81 divides the glass display image GGR into a right eye image GrR and a left eye image GrL, and outputs the images to the right eye image modification unit 82 and the left eye image modification unit 83. The right eye image modification unit 82 and the left eye image modification unit 83 use the information of the interpupillary distance LP to modify the right eye image GrR and the left eye image GrL. The modified images are output to the right eye display unit 75 and the left eye display unit 76, and are respectively output to the OLED unit for the right eye 221 and the OLED unit 241 for the left eye. A right eye display image GOR or GIR is displayed on the OLED unit 221 for the right eye, and a left eye display image GOL or GIL is displayed on the OLED unit 241 for the left eye.

In the display apparatus 100A of the second embodiment, as described above, the original image ORG of the image displayed in the glass display device 20A is prepared on the terminal device 50 side, but the interpupillary distance LP of the user is acquired by the display control unit 70A using the glass display device 20A, and the image modification matching the interpupillary distance LP is also performed on the display control unit 70A side. The terminal device 50 only outputs an image to displayed.

Figure 9:
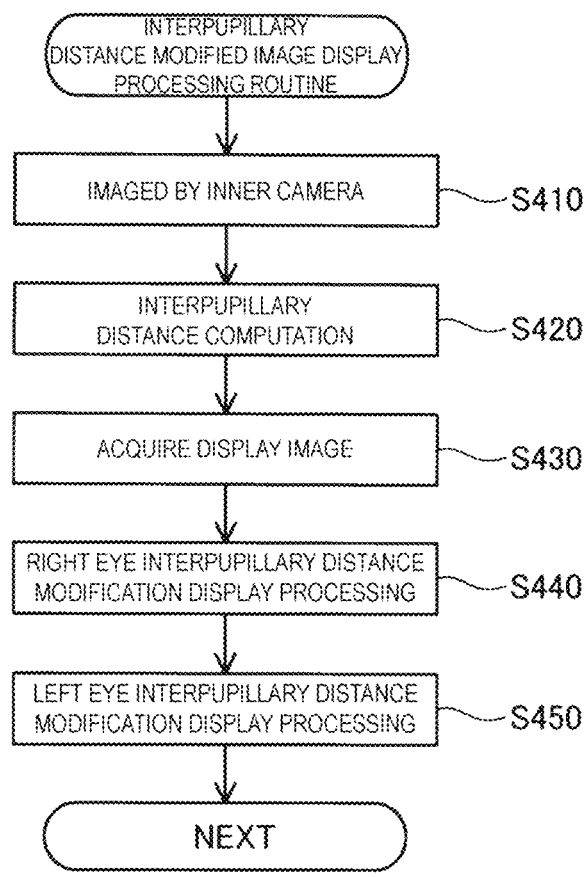
FIG. 9 is a flowchart illustrating an overview of an interpupillary distance modification image display process.

Thus, the interpupillary distance modification image display process realized by the display control unit 70A will be described in detail using the flowchart of FIG. 9. The interpupillary distance modification image display process routine illustrated in FIG. 9 is repeatedly executed when the display control unit 70A causes an image to be displayed on the glass display device 20A. Note that in this embodiment as well, the original image ORG is an image acquired by mirroring in which the image displayed on the display panel 54 is displayed on the glass display device 20A as it is.

When the interpupillary distance modification image display process routine is started, the CPU 71 first instructs the glass display device 20A to capture a facial image of the user using the inner camera 62 (step S410). Then, this image is used to calculate the interpupillary distance LP of the user (step S420). The calculation of the interpupillary distance LP may be easily performed according the image acquired by the inner camera 62. When the inner camera 62 is divided into one for the right eye and one for the left eye, the calculation may be performed according to the distance of both cameras and the position of the pupils in the captured images captured by both cameras. When the inner camera 62 is a single wide-angle camera, the calculation may be performed according to the pupil positions of both eyes in the image captured by the inner camera 62 and the parameters of an optical system of the wide-angle camera. Alternatively, the interpupillary distance LP may be determined by comparing with images captured in advance for users with different interpupillary distances.

Next, the CPU 71 performs process of acquiring the image to be displayed (step S430). This image is the glass display image GGR received from the terminal device 50 via the communication unit 74 (see FIG. 8), and specifically, the same as the right eye image GrR and the left eye image GrL acquired by dividing the glass display image GGR by the image division unit 81. The right eye image GrR and the left eye image GrL are the same image at this point. Next, a right eye interpupillary distance modification output process (step S440) and a left eye interpupillary distance modification display process (step S450), in which the acquired right eye image GrR and left eye image GrL are modified using the interpupillary distance LP calculated in step S420, are performed sequentially. The modification is performed as follows. The CPU 71 has previously acquired the interval LG of the half mirrors 261 and 281 of the glass display device 20A connected to the CPU 71. The interval LG may be manually input into the display control unit 70A by a user using an operation unit 79, or may be acquired by the CPU 71 directly instructing the glass display device 20A to output the interval LG. Thus, the interval LG and the interpupillary distance LP are compared, when they are not matched, the right eye image GrR and the left eye image GrL are modified by a shifting of them.

The right eye interpupillary distance modification output process (step S440) for modifying the right eye image GrR is performed by the right eye image modification unit 82, and the left eye interpupillary distance modification display process (step S450) for modifying the left eye image GrL is performed by the left eye image modification unit 83. Modifications performed by the right eye image modification unit 82 and the left eye image modification unit 83 will be described below with reference to the following examples. The right eye display image GOR or GIR and the left eye display image GOL or GIL, which are images after being modified by the right eye image modification unit 82 and the left eye image modification unit 83 become different images.

When the CPU 71 performs the modification in this manner to generate the right eye display image GOR or GIR, and the left eye display image GOL or GIL, these images are output via the right eye display unit 75 and the left eye display unit 76 by normal image display process, and are displayed in the glass display device 20A. Therefore, the CPU 71 exits the "next" after the end of step S450, and ends the present process routine. Note that the right eye interpupillary distance modification display process (step S440) and the left eye interpupillary distance modification display process (step S450) may be performed in parallel using two or more CPUs or GPUs.

The right eye interpupillary distance modification display process (step S440) and the left eye interpupillary distance modification display process (step S450) will be described with reference to FIG. 10 and FIG. 11. In the top row of FIG. 10 and FIG. 11, the right eye image GrR displayed on the OLED unit 221 for the right eye and the left eye image GrL displayed on the OLED unit 241 for the left eye are illustrated. Both are the same images. This image is displayed on each of the OLED unit 221 and the OLED unit 241, and this image is visually recognized by the user as an image reflected on the half mirrors 261 and 281. At this time, when the interpupillary distance LP of the user and the interval LG of the image projected onto the half mirrors 261 and 281 do not match, an inner end portion or an outer end portion of the image will be missing or blurred. In the example illustrated in FIG. 10, since the interpupillary distance LP is greater than the interval LG, the inner ends BGR of the image PsR on the half mirror 261 and the inner ends BGL of the image PsL on the half mirror 281 are blurred.

In the second embodiment, according to the magnitude of the difference between the interpupillary distance LP and the interval LG, the modification display process is separately performed on the right eye image GrR and the left eye image GrL (step S440 and step S450). In the right eye interpupillary distance modification display process (step S440), the right eye image GrR is reduced according to the difference between the interpupillary distance LP and the interval LG, and the right eye display image GOR, which is a reduced image, is moved outside the half mirror 261 and displayed. On the other hand, in the left eye interpupillary distance modification display process (step S450), the left eye image GrL is reduced according to the difference between the interpupillary distance LP and the interval LG, and the left eye display image GOL, which is a reduced image, is moved outside the half mirror 281 and displayed. Thus, as illustrated in the bottom row of FIG. 10, the right eye display image GOR and the left eye display image GOL, which are images respectively displayed on the half mirror 261 and the half mirror 281, are displayed in a state of being moved outside by dimensions dR1 and dL1 at the inner end portions of display regions of the half mirror 261 and the half mirror 281. Note that in the example illustrated in FIG. 10, the reduced image is moved outward and downward, but may be displayed in a state of being moved outward and upward.

Figure 10:
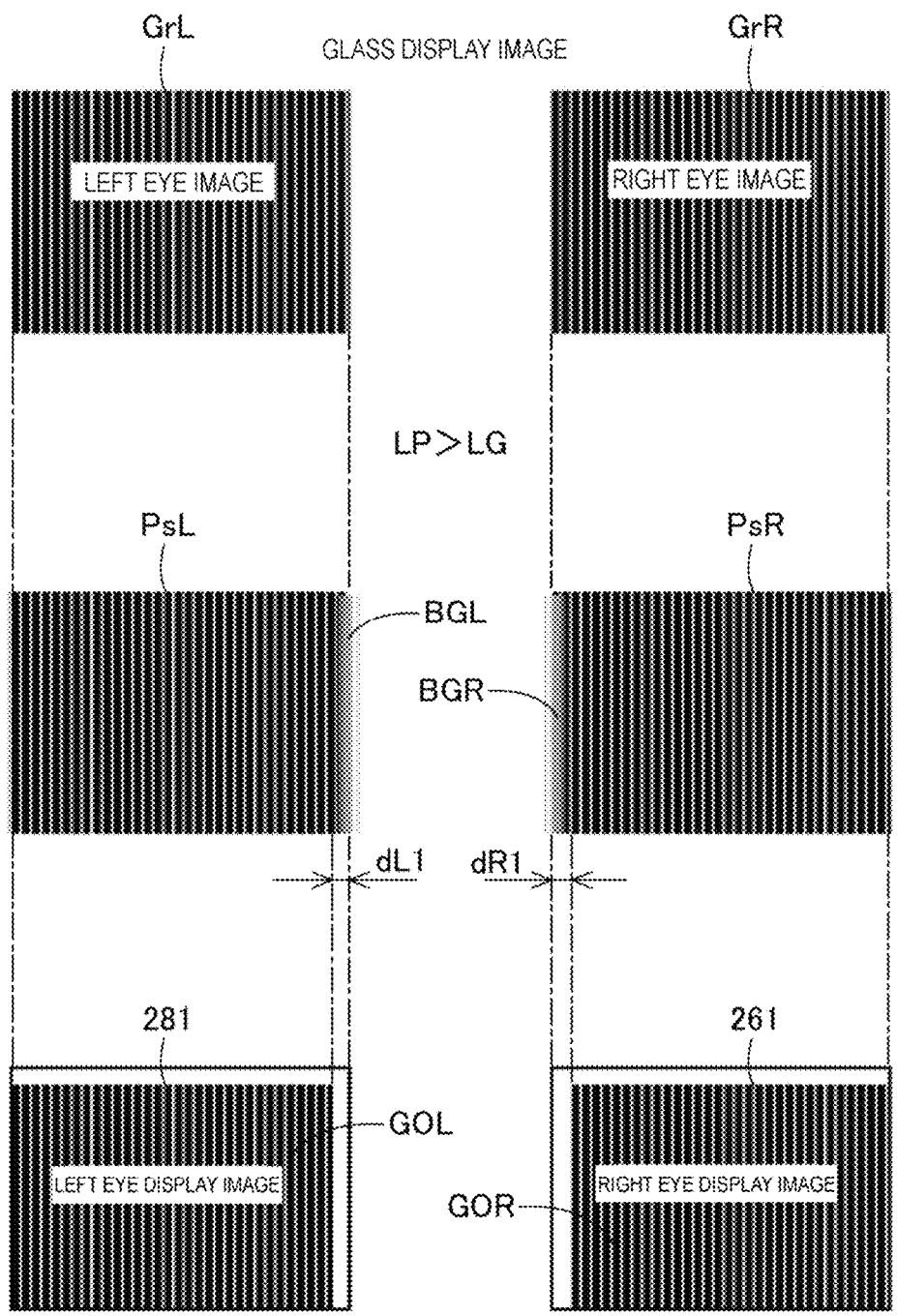
FIG. 10 is an explanatory diagram illustrating an example of image display.
Figure 11:
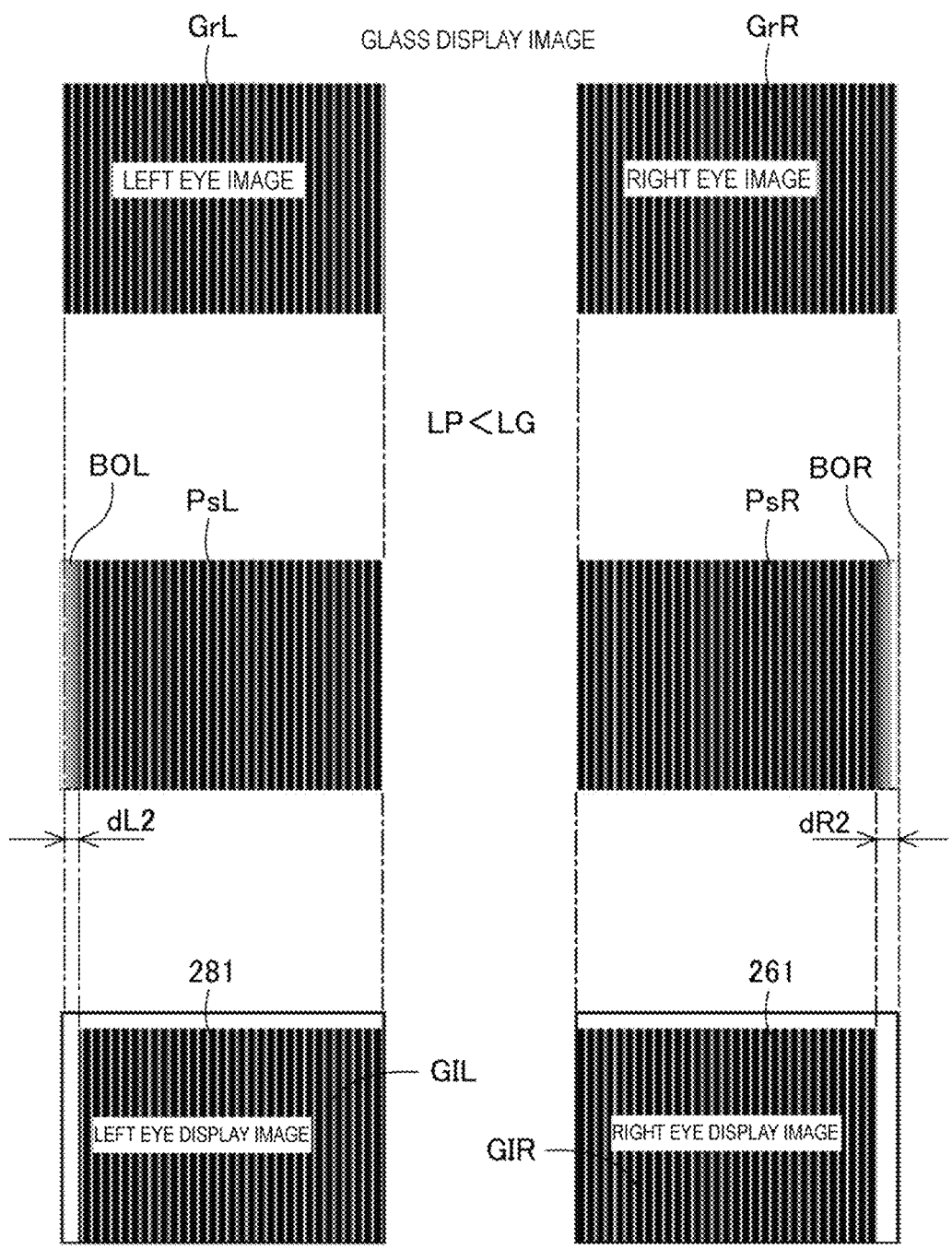
FIG. 11 is an explanatory diagram illustrating another example of image display.

In contrast to FIG. 10, a case in which the interpupillary distance LP is less than the distance LG of the half mirrors 261 and 281 is illustrated in FIG. 11. The drawing illustrates that the outer end BOR of the image PsR on the half mirror 261 and the outer end BOL of the image PsL on the half mirror 281, which are visually recognized by the user, are blurred. In this case, in contrast to the example illustrated in FIG. 10, in the right eye interpupillary distance modification display process (step S440), the right eye image modification unit 82 and the left eye image modification unit 83 reduce the right eye image GrR according to the difference between the interpupillary distance LP and the interval LG, and move the right eye display image GIR, which is a reduced image, inside the half mirror 261 and perform display. On the other hand, in the left eye interpupillary distance modification display process (step S450), the left eye image GrL is reduced according to the difference between the interpupillary distance LP and the interval LG, and the left eye display image GIL, which is a reduced image, is moved inside the half mirror 281 and displayed. Thus, as illustrated in the bottom row of FIG. 11, the right eye display image GIR and the left eye display image GIL, which are images respectively displayed on the half mirror 261 and the half mirror 281, are displayed in a state of being moved inside by dimensions dR2 and dL2 at the outer end portions of the display regions of the half mirror 261 and the half mirror 281. Note that in this example, the reduced image may be displayed in a state of being moved inward and upward.

As a result, due to the difference between the interpupillary distance LP and the gap LG, the image is not displayed at the portion where the image is missing or blurred, and thus the problem of the image is missing or blurred due to the interpupillary distance LP and the gap LG do not match is solved. Moreover, the image-reduction is not performed for the entire image but for the left image and right image respectively, thus, the degree of image-reduction can be suppressed and an image similar to the original image can be displayed. Note that in the second embodiment, the interpupillary distance LP is acquired by analyzing the image captured using the inner camera 62, but the interpupillary distance may be manually input using the operation unit 79 or the like. Alternatively, the interpupillary distance LP and the like may be input by speech recognition using the microphone 63. In the second embodiment, the glass display device 20A and the display control unit 70A are provided separately, but the glass display device 20A may be provided integrally with the display control unit 70A as those in the first embodiment. A part of the functions of the display control unit 70A may be provided in the terminal device 50. The glass display device 20A of the second embodiment includes the cameras 61R and 61L that capture the outside scenery, the microphone 63 that acquires sound or ambient sound, the earphones 32 and 34 that transmit sound to the user, the six-axis sensor 66, the illuminance sensor 65, and the like, but at least a part of these equipment may not be mounted on the glass display device 20A. Further, the electric power required for operation of the glass display device 20A may be sent from the display control unit 70A via the connection cable 40, or a battery may be incorporated into the glass display device 20A.

C. Other Embodiments

The display device of the present disclosure may also be realized in the following aspects.

(1) The display device may include an interpupillary distance acquiring unit configured to acquire an interpupillary distance of a user, two display units corresponding to both eyes of the user, an image modification unit configured to modify an original image according to a difference between an interval of the two display units and the acquired interpupillary distance, and a display control unit configured to cause the two display units to display the modified image that was modified. The display device modifies the original image according to the difference between the interval of the two display units and the acquired interpupillary distance, thus, if the modification is performed so as to eliminate missing or blurring, and the like of a part of the image due to this difference, it is possible to eliminate missing or blurring, and the like of the part of the image due to the difference in the interpupillary distance. The modification to eliminate missing or blurring, and the like may be performed by reducing the image to be displayed and displaying the image in a range corresponding to the interpupillary distance, or by cropping the image of the region missing or blurring due to difference in the interpupillary distance, or moving the image from the region where the image is missing or blurring. Conversely, the image may be modified to the opposite side to increase the degree of missing or blurring in a part of the image. In this way, it is clearly understood to the user that the interpupillary distance is not match the interval of the two display units, and it is possible to prompt adjustment of both.

(2) In the display device, the interpupillary distance acquiring unit may determine the interpupillary distance of the user from an image of a head of the user captured by an imaging unit configured to capture an image. In this way, the interpupillary distance can be acquired by simply imaging the face of the user. The interpupillary distance can be handled as the distance between the centers of the pupils of both eyes of the user, but it does not need to be the center-to-center distance of the pupils or black eyes (hereinafter referred to as pupil or the like), and any parameter may be used as long as the parameter corresponds to the separation distance of both eyes of the user. For example, it may be the interval distance closest to the bridge of the nose of the pupils or the like, that is, the separation distance between the inner ends of the pupils or the like. Similarly, it may be the separation distance between the outermost ends of the pupils or the like of both eyes. When the interpupillary distance is handled as a center-to-center distance of the pupils or the like, the center of the pupils or the like may be determined as the center of gravity on the image of the left eye, or may be determined as an intersection of a line that bisects the area of the image of the pupils or the like vertically and a line that bisects the area of the image horizontally. Other mathematical operations may be defined. To determine the interpupillary distance from an image of the head, various methods can be adopted such as a method of analyzing an image of the eyes of the user included in the image of the head of the user, a method of determining the average interpupillary distance value according to the shape of the head, and the like. When adopting the former method, a reference position of the eye captured from an imaging position of the camera or the like may be predetermined, and the interpupillary distance of the user may be determined according to a deviation from the reference position. When adopting the latter method, the average relationship between the shapes of the heads and interpupillary distances of users such as adult men or adult women may be stored in advance, and the average interpupillary distance may be determined by reference to this relationship based on the shape of the head. Alternatively, the interpupillary distance may be acquired by hand input, voice input, or the like.

(3) The display apparatus may include a terminal device that incorporates the interpupillary distance acquiring unit, and a head-mounted display device that incorporates the two display units and the display control unit, the two display units being located in front of the eyes of the user when the head-mounted display is mounted on the head of the user. In this way, the acquisition of the interpupillary distance can be performed on the terminal device, which is convenient. Various devices can be used as the terminal device, such as a smart phone used in the above-described embodiments, and a dedicated controller or computer, a server connected via a network, and the like.

(4) In the display apparatus, the terminal device may further incorporate an original image generating unit configured to generate an original image to be displayed on the head-mounted display device, and the image modification unit, and the terminal device may be configured to transmit the modified image modified by the image modification unit to the head-mounted display device via communication. In this way, the terminal device that generates the image to be displayed on the display unit may perform the modification due to the difference in the interpupillary distance, and the device configuration can be simplified.

(5) In the display apparatus, the terminal device may include a transmitting unit configured to transmit the acquired interpupillary distance to the head-mounted display device, and the head-mounted display device may incorporate the image modification unit and may include a receiving unit configured to receive the transmitted interpupillary distance and output the received interpupillary distance to the image modification unit. The modification of the image using the information of the interpupillary distance acquired by the terminal device is not limited to be performed on the terminal device, and may be performed on the head-mounted display device side, this makes it possible to increase the degree of freedom of the device configuration.

(6) In the display apparatus, the image modification unit may generate the modified image by reducing the original image into an image that falls within a range where there is no difference between the interval of the two display units and the acquired interpupillary distance. In this way, the modification can be easily performed. In this way, the modification can be easily performed. Note that, instead of reducing the entire image, a part that is missing or blurred due to the difference between in interpupillary distance may be deleted from the image.

(7) In the display apparatus, the image modification unit may be configured to generate a modified image for each of the two display units by modifying the original image according to a difference between the interval of the two display units and the acquired interpupillary distance. In this way, the modified image can be generated for each of the two display units, and thus a modified image suitable for the display unit can be used. In this case, the image modification may be different for each display unit.

(8) As another aspect of the present disclosure, a display method for displaying an image on two display units provided corresponding to both eyes of a user may be realized. The display method acquires an interpupillary distance of the user, modifies an original image according to a difference between the interval of the two display units and the acquired interpupillary distance, and causes the two display units to display the modified image that was modified. According to this method, the original image according to the difference between the interval of the two display units and the acquired interpupillary distance, thus, if the modification is performed so as to eliminate missing or blurring, and the like of a part of the image due to this difference, it is possible to eliminate missing or blurring, and the like of the part of the image due to the difference in the interpupillary distance. Conversely, the image may be modified to the opposite side to increase the degree of missing or blurring in a part of the image. In this way, it is clearly understood to the user that the interpupillary distance is not match the interval of the two display devices, and it is possible to prompt adjustment of both.

(9) Further, as still another aspect of the present disclosure, an image adjustment method for adjusting an image to be displayed on two display units provided corresponding to both eyes of a user may be realized. The image adjustment method acquires an interpupillary distance of the user and adjusts an original image according to a difference between the interval of the two display units and the acquired interpupillary distance. According to this image adjustment method, the original image according to the difference between the interval of the two display units and the acquired interpupillary distance, thus, if the modification is performed so as to eliminate missing or blurring, and the like of a part of the image due to this difference, it is possible to eliminate missing or blurring, and the like of the part of the image due to the difference in the interpupillary distance. Conversely, the image may be modified to the opposite side to increase the degree of missing or blurring in a part of the image. In this way, it is clearly understood to the user that the interpupillary distance is not match the interval of the two display devices, and it is possible to prompt adjustment of both.

(10) In addition, the above-described embodiments may be variously modified or the configuration may be replaced. For example, the image division unit 81 of the above-described embodiment may divide the right display image and left display image as the same image, but may not be limited to the same image, and may separately generate a right eye image and a left eye image. These separately generated images are considered as images to which parallax information is added for stereoscopic viewing from the original image. Additionally, as an augmented reality image, an image for the right eye or the left eye may be an image in which a part is missing or deformed as compared with an image for another eye. By making the right and left images different from each other, the unrealistic feeling may be emphasized. Further, in the embodiment described above, the image displayed on the glass display device 20 or 20A is the same image as the image displayed on the terminal device 50, that is, the image is displayed by mirroring, but the terminal device 50 may transmit an image different from the image displayed on the display panel 54 to the display control unit 70 or 70A, and display this image on the glass display device 20 or 20A. The different images may be images partially different from each other or may be images entirely different from each other, such as in a game player image and a score table. Of course, the terminal device 50 may have a configuration in which the terminal device 50 outputs an image to be displayed on the glass display device 20 or 20A without performing display on the terminal device 50 side. Furthermore, the image displayed on the glass display device 20 or 20A may be an image generated by the display control unit 70 or 70A.

(11) In each of the above-described embodiments, part of the configuration realized by the hardware may be replaced with software. At least part of the configuration realized by software may be realized by a discrete circuit configuration. Further, in a case where part of the functions or the entire functions of the present disclosure is achieved by the software, the software (computer program) may be provided in a form stored in a computer-readable recording medium. In the present disclosure, "computer-readable recording medium" is not limited to a portable recording medium such as a flexible disk and a CD-ROM, but includes various internal storage devices such as a RAM and a ROM and various external storage devices fixed to a computer such as a hard disk. In other words, "computer-readable recording medium" has a broad range of definition including any recording device capable of non-transitorily and fixedly storing data packet.

The present disclosure is not limited to the exemplary embodiments described above, and can be realized in various configurations without departing from the gist of the present disclosure. For example, appropriate replacements or combinations may be made to the technical features in the embodiments that correspond to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A display apparatus, comprising:
   a terminal device that includes a first processor configured to acquire an interpupillary distance of a user; and
   a head-mounted display device that includes two display units corresponding to both eyes of the user and a second processor,
   wherein the two display units are located in front of the eyes of the user when the head-mounted display is mounted on the head of the user,
   wherein the first processor acquires the interpupillary distance of the user from an image of a head of the user captured by an imaging unit of the terminal device and is configured to reduce an original image to a modified image so that there is no difference between an interval of the two display units and the acquired interpupillary distance, and
   wherein the second processor is configured to cause the two display units to display the modified image that was modified.

2. The display apparatus according to claim 1, wherein:
   the first processor is further configured to generate the original image to be displayed on the head-mounted display device, and
   the terminal device is configured to transmit the modified image modified by the first processor to the head-mounted display device via communication.

3. The display apparatus according to claim 1, wherein the terminal device includes a transmitting unit configured to transmit the acquired interpupillary distance to the head-mounted display device, and
   the head-mounted display device further includes a receiving unit configured to receive the transmitted interpupillary distance and output the received interpupillary distance to the second processor.

4. The display apparatus according to claim 1, wherein the first processor is configured to generate the modified image for each of the two display units.

* * * * *